United States Patent [19]

Stauffer et al.

[11] 4,304,677
[45] Dec. 8, 1981

[54] METHOD OF SERVICING WELLBORES

[75] Inventors: Randall C. Stauffer; Andrew J. Pasztor, both of Midland, Mich.

[73] Assignee: The Dow Chemical Company, Midland, Mich.

[21] Appl. No.: 939,509

[22] Filed: Sep. 5, 1978

[51] Int. Cl.³ .................. E21B 33/13; E21B 43/11; E21B 43/00
[52] U.S. Cl. .................. 252/8.55 R; 166/244 R; 166/278; 166/297
[58] Field of Search .......... 252/8.5 B, 8.5 A, 8.55 R, 252/8.5 R; 166/297, 278, 244 R

[56] References Cited

U.S. PATENT DOCUMENTS

| | | | |
|---|---|---|---|
| 2,073,413 | 3/1937 | Cross et al. | 252/8.5 |
| 2,239,647 | 4/1941 | Garrison | 252/8.5 X |
| 2,805,722 | 9/1957 | Morgan et al. | 252/8.55 X |
| 2,894,584 | 7/1959 | Birdwell et al. | 252/8.55 X |
| 2,898,294 | 8/1959 | Priest et al. | 252/8.55 |
| 3,000,818 | 9/1961 | Abbott | 252/8.55 |
| 3,012,606 | 12/1961 | Brooke | 252/8.55 X |
| 3,126,950 | 3/1964 | Carlberg et al. | 252/8.55 X |
| 3,272,741 | 9/1966 | Brukner et al. | 252/8.55 |
| 3,993,570 | 11/1976 | Jackson et al. | 252/8.55 X |

OTHER PUBLICATIONS

Chemical Abstracts, vol. 80, 1974, p. 273, Abstract No. 74711t.
Gufco Services, Inc. Price List-Bromical HD, Feb. 1, 1978.
Wright, Article in *World Oil*, Jun., 1978, pp. 53-56, 68 and 96.
Gufco Services Inc., Displacement and Gravel Pack Case History Using "Bromical HD", Dec. 27, 1977.
Great Lakes Chemical Corp. Product Information, Supplied by Magcobar Technical Services.
Hudgins et al., Article in *World Oil*, Jun. 1961, pp. 113-119.
Plonka, Article in *World Oil*, Apr., 1972, pp. 88 and 89.
Mellor, *A Comprehensive Treatise on Inorganic and Theoretical Chemistry*, vol. IV, 1923.
Hudgins et al., *Drilling and Production Practice*, 1961, pp. 160-168.
Helvenston et al., *Journal of Chemical and Engineering Data*, vol. 9, No. 3, Jul. 1964, pp. 321-323.
Hudgins, *Journal of Chemical and Engineering Data*, vol. 9, No. 3, Jul. 1964, pp. 434-436.
*The Oil and Gas Journal*, Aug. 2, 1971, pp. 62-64.
Hudgins et al., *The Oil and Gas Journal*, Jul. 24, 1961, pp. 91-96.

Primary Examiner—Herbert B. Guynn
Attorney, Agent, or Firm—James M. Kuszaj

[57] ABSTRACT

The servicing of wellbores with a high density fluid to maintain an elevated pressure on a portion of the formation penetrated by the well is improved. The improvement comprises injecting as the high density fluid a substantially solids-free aqueous solution of calcium bromide and zinc bromide having a density of at least about 15 pounds per gallon. The aqueous solution is prepared by reacting hydrogen bromide with zinc or compounds of zinc in the presence of an aqueous calcium bromide solution.

21 Claims, 1 Drawing Figure

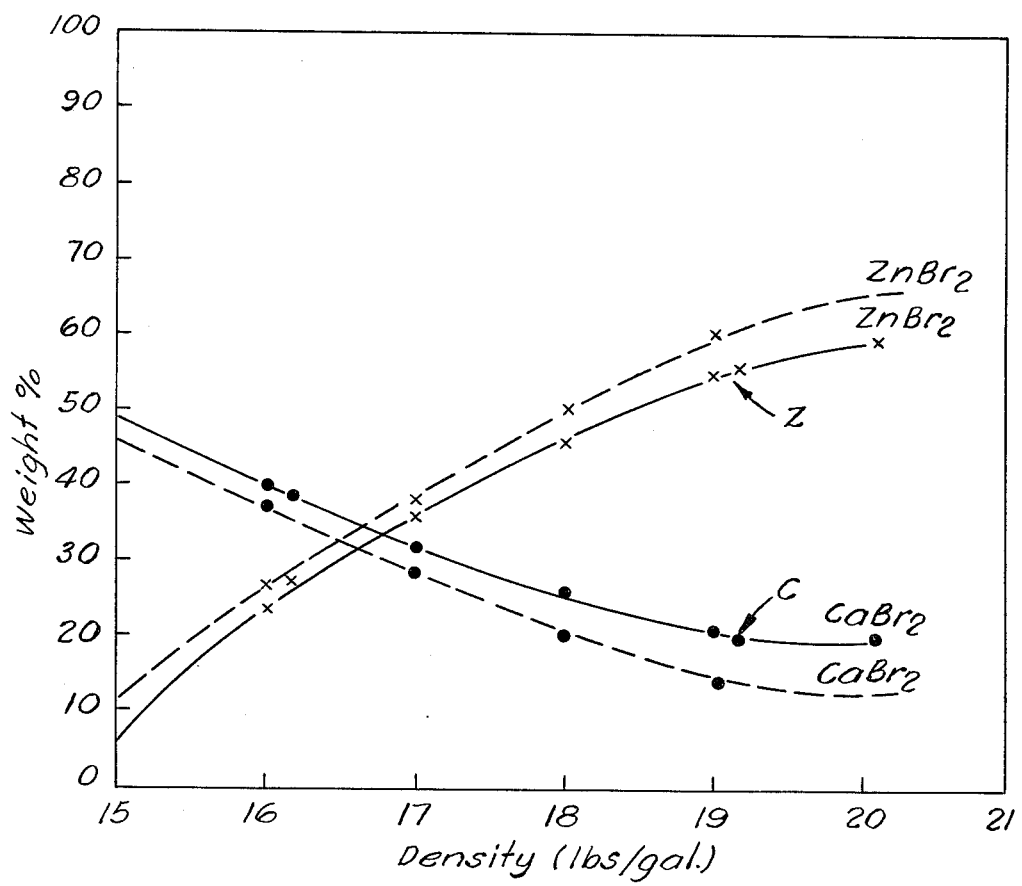

METHOD OF SERVICING WELLBORES

BACKGROUND OF THE INVENTION

The present invention relates generally to servicing wells by the use of high density fluids. More particularly, the present invention relates to servicing wells by injecting as the high density fluid an aqueous solution of inorganic salts. The invention also relates to a method of preparing the aqueous solution.

In many wells, e.g., oil, gas, etc., it may be desirous to contain the formation pressure by employing a hydrostatic head. This may be needed during the squeezing of sand consolidation compositions, during perforation operations, during well shut-ins, during gravel packing, or the like. Many well-servicing fluids, sometimes referred to as completion or packer fluids, have been employed. These include, for example, drilling muds, salt water, brines, water, oil, $ZnCl_2$-$CaCl_2$ solution, $CaCl_2$-$CaBr_2$ solutions and the like.

However, drilling muds are not completely satisfactory as a well-servicing fluid because solids contained in the muds frequently tend to plug the formation. Although solutions of certain inorganic salts tend to be particle-free, there are other difficulties with their use as well-servicing fluids. For example, most inorganic salt solutions commonly used in wells in the Gulf Coast region of the United States are low density fluids having high crystallization temperatures (temperature at which solids first appear in the solution upon heating or cooling). For instance, sodium chloride-based fluids have a density of from 8.3 to about 9.8 pounds per gallon (ppg); solutions of calcium chloride have a density of from about 8.3 to about 11.5 ppg; solutions of calcium chloride and zinc chloride have a density of from about 11.5 to 14.0 ppg; and solutions of $CaCl_2$ and $CaBr_2$ have densities of from about 11.6 to about 15.1 ppg.

In recent years, deeper, high-pressure wells have resulted in a need for solids-free, well-servicing fluids having higher densities than are currently available. This is particularly true of wells in the Gulf of Mexico (offshore Louisiana). Here, hydrostatic pressures higher than normal often require well-servicing fluids having densities in excess of 15 pounds per gallon and crystallization points below about 50° F.

It would therefore be desirable to develop a well-servicing fluid which had controllable densities in excess of about 15 pounds per gallon. Precipitation or settling out of solids during storage of the fluid or servicing of wells with the fluid should be avoided.

SUMMARY OF THE INVENTION

A well-servicing fluid having the above-described desirable properties has now been developed for use in servicing wells.

The present invention is an improvement in a method of servicing a wellbore with a high density fluid to maintain an elevated pressure on at least a portion of the formation penetrated by the well. The method involves placing a hydrostatic head on the formation by injecting a high density fluid into the borehole. The improvement comprises injecting as the high density fluid a substantially solids-free aqueous solution of calcium bromide and zinc bromide having a density of at least about 15 pounds per gallon.

The present invention also relates to a process for preparing a high density well-servicing fluid. The process comprises reacting sufficient amounts of hydrogen bromide and zinc or a zinc compound in the presence of water and calcium bromide to form an aqueous solution of calcium bromide and zinc bromide having a density of at least about 15 pounds per gallon.

DESCRIPTION OF THE DRAWINGS

The FIGURE graphically denotes the relationship between the quantities of calcium bromide and zinc bromide and the density of the well-servicing fluid.

DESCRIPTION OF THE INVENTION

The high density well-servicing fluid employed in the present invention consists essentially of a substantially solids-free aqueous solution of calcium bromide and zinc bromide. The amounts of calcium bromide and zinc bromide dissolved in the aqueous solution can vary depending upon the final density desired. However, calcium bromide and zinc bromide should be present in sufficient amounts to produce a well-servicing fluid having a density of at least about 15 pounds per gallon.

The FIGURE illustrates how the density of the aqueous well-servicing fluid is controlled by employing varying amounts of calcium bromide and zinc bromide. For example, at a density of about 19.1 pounds per gallon, the well-servicing fluid contains about 57 percent by weight zinc bromide (Point Z) and about 20 percent by weight calcium bromide (Point C), the remainder comprising water. The amounts of calcium bromide and zinc bromide required to achieve any other desired density can be determined in a similar manner from FIG. 1, or by simple laboratory procedures.

In addition to calcium bromide and zinc bromide, minor amounts (less than about 1 percent by weight) of other water-soluble materials can optionally be employed in the aqueous well-servicing solution. Such materials include, for example, corrosion inhibitors such as triethanol amine, propargyl alcohol, pyridine and its derivatives and the like; viscosity adjusting reagents such as, for example, hydroxymethylcellulose; pH-controlling bases such as zinc oxide, calcium hydroxide, and the like. In some aplications, it may be desirable to blend the calcium bromide-zinc bromide solution with other inorganic salt solutions to adjust the final density of the well-servicing fluid. Inorganic salts suitable for such use include, for example, sodium chloride, calcium chloride, calcium bromide, mixtures thereof, and the like. In one embodiment, it is preferred to blend a calcium bromide-zinc bromide solution having a density of about 19.2 pounds per gallon with an aqueous calcium chloride-calcium bromide solution having a density of about 15.0 pounds per gallon.

In the practice of the present invention, the density of the calcium bromide-zinc bromide solution to be employed in servicing any particular well will depend upon such consideration as the depth of the well, the pressure in the well, where the servicing fluid is employed and the like. Generally, it is preferred to employ an aqueous calcium bromide-zinc bromide solution having a density of from about 15 to about 17 pounds per gallon. However, a well-servicing fluid having a density of from about 18 to about 20 pounds per gallon may be used if desired, and is preferred when the calcium bromide-zinc bromide solution is blended with aqueous solutions of other inorganic salts.

Methods of servicing wells which can be improved by practicing the principles of the present invention include, for example, perforation treatments, consolidation treatments, moth-balling (shutting in the well) and the like. Techniques and equipment well known in the art can be employed to inject, hold, return and otherwise control the aqueous solution of the present invention. Examples of servicing techniques where the aqueous solution of the present invention can be employed are taught, for example, in U.S. Pat. Nos. 2,894,584; 2,898,294 and 3,126,950. The teachings of these patents are specifically incorporated herein by reference.

The aqueous calcium bromide-zinc bromide solution can be formulated by various techniques to obtain the desired density. For example, aqueous solutions of calcium bromide and zinc bromide can be blended together. Alternatively, solid calcium bromide or zinc bromide can be added to an aqueous solution of calcium bromide or an aqueous solution of zinc bromide to adjust the solution to the desired density. In a third method, an aqueous solution containing both calcium bromide and zinc bromide can be diluted by the addition of an aqueous solution of calcium bromide. Applicants have now discovered a novel technique for preparing the aqueous solution which unexpectedly minimizes the weight percentage of zinc bromide required to achieve a given density.

This novel technique comprises reacting hydrogen bromide with zinc or a zinc compound to form zinc bromide in the presence of water and calcium bromide. Any zinc material which will react with hydrogen bromide to form zinc bromide can be employed. Suitable materials include zinc metal, zinc carbonate, zinc hydroxide and zinc oxide. The preferred zinc material is zinc oxide. While an aqueous solution of hydrogen bromide can be used, it is preferred to employ substantially anhydrous hydrogen bromide to minimize the amount of water in the system.

The reaction is generally carried out at a temperature sufficient to prevent excessive loss of water from the reaction mixture. A temperature of from about 50° to about 150° C. has been found to be satisfactory. It has also been found preferable to filter the solution following the reaction to remove undesirable solids, i.e., unreacted zinc compounds or impurities in the calcium bromide solution.

The pH of the final aqueous well-servicing fluid should preferably be sufficient to prevent precipitation of zinc containing compounds and also sufficient to prevent excessive corrosion of the well-bore. A pH of from about 5 to about 6 has been found to be satisfactory and is preferred. Thus, it may be desirable in some instances where excess hydrogen bromide has been employed in forming the fluid, to add sufficient amounts of a suitable water-soluble base to maintain the proper pH level. Suitable bases contain zinc and/or calcium cations, and can include such compounds as zinc oxide, calcium hydroxide, calcium carbonate, and the like.

The particular weight ratio of calcium bromide and zinc bromide required by the preferred formulation method to achieve a desired density in the final solution can be found in FIG. 1 (solid lines). Generally, the weight ratio of calcium bromide to zinc bromide will be from about 1.6:1 to about 0.2:1, preferably from about 0.5:1 to about 0.2:1.

The present invention is further illustrated by the following examples.

EXAMPLE 1

A 50 gallon reactor vessel was charged with 270 pounds of a 53.5 percent by weight calcium bromide solution and 78 pounds of zinc oxide. Gaseous hydrogen bromide was introduced into the reactor at a flow rate of about 1.5 pounds per minute until about 150 pounds of hydrogen bromide had been added. Another 78 pounds of zinc oxide were then added to the reactor. Additional hydrogen bromide was introduced into the reactor until the pH of the 1 to 10 dilution of the solution changed from about 5.5 to about 2. (Because of the hygroscopic nature of the solution, the pH can best be determined by a 1 to 10 dilution with water and then measuring the pH of the diluted sample with a standardized pH probe.) Subsequently, 3 gallons of water and about 2.6 pounds of calcium hydroxide were added to the reactor. The solution was filtered and analyzed. The density of the solution was 19.2 pounds per gallon. The crystallization point (the temperature where solids first appear upon heating or cooling of a solution) was 16° F. and the pH of a 1 to 10 dilution was 5.6. The solution contained about 56.7 percent by weight zinc bromide, about 19.7 percent by weight calcium bromide and about 23.6 percent by weight water.

EXAMPLE 2

A 1.5 liter resin kettle was fitted with a mechanical stirrer, thermometer, vent scrubber, and gas addition ports. The reactor was charged with 715 ml of 53.5 percent calcium bromide solution, having a density of 1.705 g/cm$^3$ and 153.3 gms of zinc oxide. Over a five hour period, 310 grams of HBr were added to the solution. The final pH of the solution was 2.5. After an additional 2 gms of zinc oxide were added to the reactor, the solution was filtered. The final pH of the solution was found to be 5.5. The density was 16.2 lb/gal. The crystallization point was 39° F. The solution contained about 26.7 percent by weight zinc bromide, about 38.5 percent by weight calcium bromide and about 34.8 percent by weight water.

EXAMPLE 3

A reactor similar to that in Example 2 was charged with 500 ml of a 53.5 percent calcium bromide solution. To this was added 235.9 gms of ZnO. Anhydrous HBr was slowly added to the reactor. After 400 gms of HBr had been added to the reactor, another 235.9 gms of ZnO was added to the reactor. HBr was added again so that the total mass of HBr added to the reactor was 990 gms. The pH of the solution at this point was 2.0. Then 8.5 gms of ZnO were added to adjust the pH and the solution was filtered. The final pH of the solution was 5.5. The density was 20.10 lb/gal. The crystallization point was less than 50° F. The solution contained about 59.6 percent by weight zinc bromide, 19.9 percent by weight calcium bromide and about 20.5 percent by weight water.

A series of solutions is prepared according to the process described in Examples 1-3. The amount of calcium bromide and zinc bromide is varied to achieve a density of between 15 and 19 pounds per gallon. The relationship between the quantity of calcium bromide, zinc bromide and density is graphically depicted in the FIGURE (solid lines).

Another series of solutions was prepared by mixing an 80 percent by weight zinc bromide solution having a density of 21.5 pounds per gallon with a calcium bromide solution having a density of 14.2 pounds per gallon. The amount of each solution employed was varied to achieve a density of between 15 and 19 pounds per gallon. The relationship between the quantity of calcium bromide, zinc bromide and density is graphically depicted in the FIGURE (dotted lines).

From the results depicted in the FIGURE, it is clear that a high density well-servicing fluid of calcium bromide and zinc bromide having a density of from about 15 to about 20 pounds per gallon can be produced. Moreover, when such a fluid is prepared by preferred technique, the amount of zinc present in the fluid at a predetermined density is unexpectedly reduced.

What is claimed is:

1. A composition consisting essentially of a substantially solids-free aqueous solution of calcium bromide and zinc bromide, said solution having a density of at least about 18 pounds per gallon and a crystallization point of less than about 50° F., prepared by reacting hydrogen bromide and zinc or a zinc compound in the presence of water and calcium bromide.

2. The composition of claim 1 wherein the calcium bromide is 19.9 to 26 weight percent and the zinc bromide is 46 to 59.6 weight percent.

3. The composition of claim 2 wherein the ratio of calcium bromide to zinc bromide is from about 0.5:1 to about 0.2:1.

4. A composition consisting essentially of a substantially solids-free aqueous solution of calcium bromide and zinc bromide, said solution having a density of at least about 18 pounds per gallon and a weight ratio of calcium bromide to zinc bromide of from about 0.5:1 to about 0.2:1 prepared by reacting hydrogen bromide and zinc or a zinc compound in the presence of water and calcium bromide.

5. A composition consisting essentially of a substantially solids-free aqueous solution of calcium bromide and zinc bromide, said solution having a density of at least 18 pounds per gallon and a crystallization point of less than about 50° F. prepared by a process comprising:
   (a) adding a zinc or zinc compound which will react with hydrogen bromide to form zinc bromide to a mixture of calcium bromide and water;
   (b) adding an excess of hydrogen bromide;
   (c) adding a sufficient amount of a base containing zinc or calcium cations to maintain a pH of from about 5 to about 6.

6. A composition consisting essentially of a substantially solids-free aqueous solution of calcium bromide and zinc bromide, said solution having a density of at least 18 pounds per gallon and a weight ratio of calcium bromide to zinc bromide of from about 0.5:1 to about 0.2:1 prepared by a process comprising:
   (a) adding a zinc or zinc compound which will react with hydrogen bromide to form zinc bromide to a mixture of calcium bromide and water;
   (b) adding an excess of hydrogen bromide;
   (c) adding a sufficient amount of a base containing zinc or calcium cations to maintain a pH of from about 5 to about 6.

7. The composition of claim 5 or 6 wherein zinc oxide is added in step (a) as the zinc compound and in step (c) as the base.

8. A composition prepared by a process comprising: reacting sufficient amounts of hydrogen bromide and zinc or a zinc compound in the presence of water and calcium bromide to form a solids free aqueous solution of calcium bromide and zinc bromide having a density of from about 18 pounds per gallon to about 20 pounds per gallon.

9. A composition prepared by a process comprising:
   (a) adding a zinc or a zinc compound which will react with hydrogen bromide to form zinc bromide to a mixture of calcium bromide and water;
   (b) adding an excess of hydrogen bromide; and
   (c) adding sufficient amounts of a base containing zinc or calcium cations to maintain a pH of from about 5 to about 6, to form an aqueous solution of calcium bromide and zinc bromide having a density of from about 18 pounds per gallon to about 20 pounds per gallon.

10. The composition of claim 8 having a pH of 5 to about 6.

11. The composition of claim 8 or 9 having a crystallization point of less than about 50° F.

12. The composition of claim 8 or 9 having a weight ratio of calcium bromide to zinc bromide of from about 0.5:1 to about 0.2:1.

13. A process of preparing a high density well-servicing fluid comprising: reacting sufficient amounts of hydrogen bromide and zinc or a zinc compound in the presence of water and calcium bromide to form an aqueous solution of calcium bromide and zinc bromide having a density at least from about 18 pounds per gallon.

14. The process of claim 13 wherein the zinc compound is selected from the group consisting of zinc carbonate, zinc hydroxide and zinc oxide.

15. The process of claim 13 wherein the zinc compound is zinc oxide.

16. The process of claim 13 wherein the reaction is conducted at temperatures of from about 50° to about 150° C.

17. The process of claim 13 wherein the hydrogen bromide is substantially anhydrous.

18. In the method of servicing a wellbore with a high density fluid to maintain an elevated pressure on at least a portion of the formation consisting of placing a hydrostatic head on such formations by injecting a high density fluid into the borehole, the improvement comprising: injecting as the high density fluid a substantially solids-free aqueous solution consisting essentially of a solution of calcium bromide and zinc bromide prepared by the process of claim 5.

19. The method of claim 18 wherein the solution has a crystallization point of less than about 50° F.

20. A process for preparing a high density well-servicing fluid comprising:
   (a) adding zinc or a zinc compound which will react with hydrogen bromide to form zinc bromide to a mixture of calcium bromide and water;
   (b) adding an excess of hydrogen bromide; and
   (c) adding sufficient amount of a base containing zinc or calcium cations to maintain a pH of from about 5 to about 6, to form an aqueous solution of calcium bromide and zinc bromide having a density of from about 18 pounds per gallon to about 20 pounds per gallon.

21. The process of claim 20 wherein the zinc material and the base are zinc oxide.

* * * * *

UNITED STATES PATENT AND TRADEMARK OFFICE
CERTIFICATE OF CORRECTION

PATENT NO. : 4,304,677
DATED : December 8, 1981
INVENTOR(S) : Randall C. Stauffer; Andrew J. Pasztor It is certified that error appears in the above-identified patent and that said Letters Patent are hereby corrected as shown below:

Col. 2, line 43, delete "aplications" and insert --applications--.

Signed and Sealed this

Fourth Day of May 1982

[SEAL]

Attest:

GERALD J. MOSSINGHOFF

Attesting Officer

Commissioner of Patents and Trademarks

UNITED STATES PATENT AND TRADEMARK OFFICE
CERTIFICATE OF CORRECTION

PATENT NO. : 4,304,677

DATED : December 8, 1981

INVENTOR(S) : Randall C. Stauffer; Andrew J. Pasztor

It is certified that error appears in the above-identified patent and that said Letters Patent is hereby corrected as shown below:

Col. 6, Claim 13, line 28, insert the word -- of -- after the word "density" and delete "from" after the word "least".

Signed and Sealed this

Eighth Day of February 1983

[SEAL]

Attest:

Attesting Officer

GERALD J. MOSSINGHOFF

Commissioner of Patents and Trademarks